No. 777,488. PATENTED DEC. 13, 1904.
F. D. RHODES.
FISH BAIT OR LURE.
APPLICATION FILED NOV. 2, 1903.
NO MODEL.
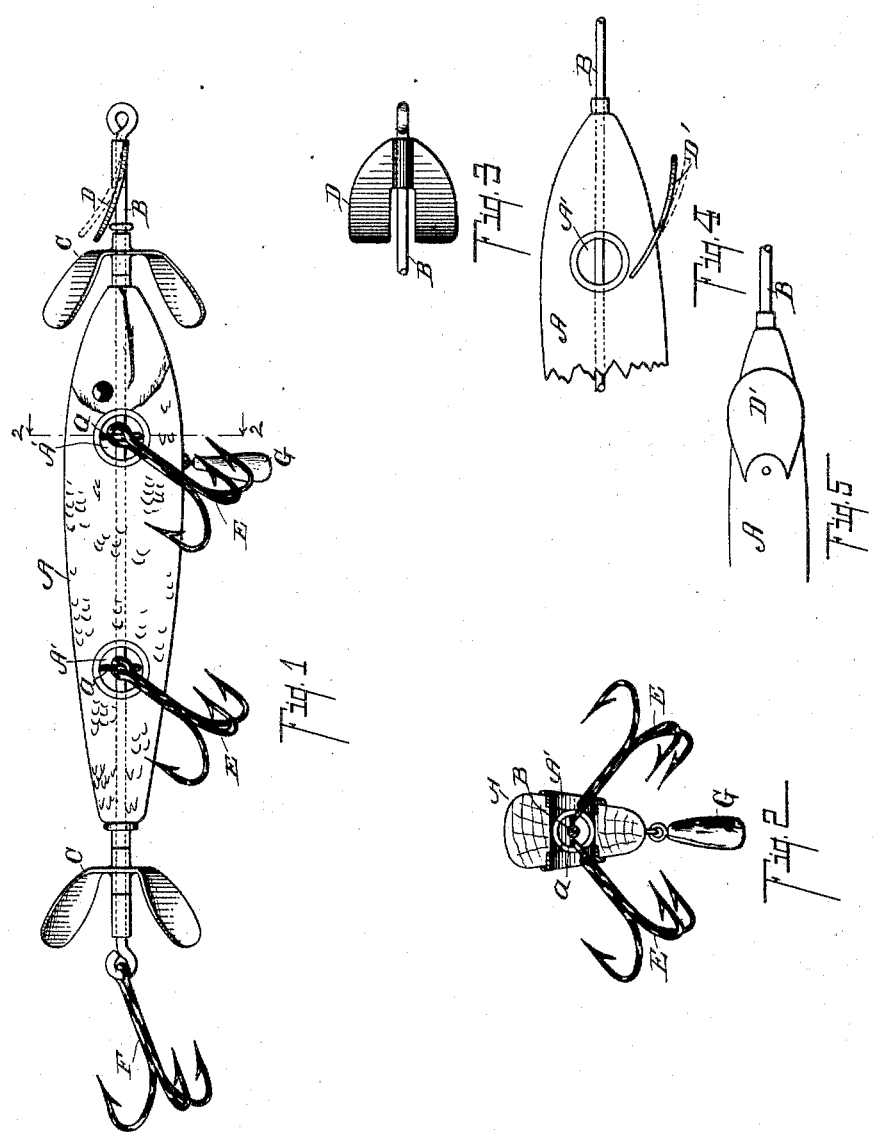
Witnesses:
Inventor,
Fred D Rhodes No. 777,488.

Patented December 13, 1904.

UNITED STATES PATENT OFFICE.

FRED D. RHODES, OF KALAMAZOO, MICHIGAN, ASSIGNOR TO FREDERICK C. AUSTIN, OF CHICAGO, ILLINOIS.

FISH BAIT OR LURE.

SPECIFICATION forming part of Letters Patent No. 777,488, dated December 13, 1904.

Application filed November 2, 1903. Serial No. 179,521. (No model.)

*To all whom it may concern:*

Be it known that I, FRED D. RHODES, a citizen of the United States, residing at the city of Kalamazoo, county of Kalamazoo, State of Michigan, have invented certain new and useful Improvements in Fish Baits or Lures, of which the following is a specification.

This invention relates to improvements in fish baits or lures.

The objects of this invention are, first, to provide an improved fish bait or lure which is adapted for use as a surface or as a casting bait and also as a deep-water or as a trolling bait; second, to provide an improved fish bait or lure which may be readily adjusted to regulate the depth at which the same shall run in the water; third, to provide an improved fish bait or lure adapted to maintain its proper upright position in the water; fourth, to provide, in a fish bait or lure, an improved means of securing the hooks in position.

Further objects and objects relating to structural details will definitely appear from the detailed description to follow.

I accomplish the objects of my invention by the devices and means described in the following specification.

The invention is clearly defined, and pointed out in the claims.

A structure embodying the features of my invention is clearly illustrated in the accompanying drawings, forming a part of this specification, in which—

Figure 1 is a side elevation view of my improved fish bait or lure. Fig. 2 is a detail transverse sectional view taken on a line corresponding to line 2 2 of Fig. 1 looking in the direction of the little arrows at the ends of the section-line. Fig. 3 is a detail plan view of the guiding blade or fin D. Fig. 4 is a detail side elevation view of a modified construction. Fig. 5 is an inverted plan view of the structure appearing in Fig. 4.

In the drawings similar letters of reference refer to similar parts throughout the several views.

Referring to the drawings, the body portion A of my improved bait or lure is preferably shaped like a minnow and may be suitably painted or decorated, as desired. Arranged longitudinally through the body portion A, which is secured thereto, is a rod B. The front end of the rod B is formed into a loop for convenience in attaching the line. The tail or trailing hook F is secured to the rear end of the rod B. Transverse openings A' are formed through the body, one for each pair of hooks which it is desired the body shall carry. These openings are provided with suitable metal socket-rings, as clearly appears in Fig. 2. A split ring $a$ is provided for each pair of hooks. (See Fig. 2.) By this means the hooks are detachably secured in position and may be readily changed as desired or in case one should become broken may be readily renewed. The shanks of the hooks rest on the edges of the holes or sockets, so that the points of the hooks are supported out from the body in position to receive the strike of the fish. They are also supported so that the body of the minnow is not abraded by the friction of the hook-points against the same.

Suitable spinners C are arranged on the rod B at the front and rear of the body A. These may be of the usual or any desired construction.

A guiding blade or fin D is secured to the rod B at its forward end. This guiding blade or fin preferably consists of a central portion and a pair of rearwardly-extending wings and is preferably formed of flexible sheet metal adapted to be bent, so that the relative angle of the wings to the body or to the rod B may be varied, as is indicated in dotted lines in Fig. 1. The guiding blade or fin D is also adapted to keep the bait in an upright position in the water and should the same strike upon its side will turn the same to the upright position.

The depth at which the bait shall run in the water is regulated by varying the angle of the guiding blade or fin. The greater the angle of the blade the deeper the bait will run in the water. It is found in practice that with the blade set at a certain angle the bait will quickly dive to a certain depth and as it is drawn through the water maintain about that position, with a slight up-and-down motion as it is drawn through the water. I also provide a suitable weight-sinker G, which is secured to the bottom of the bait in the usual manner. The bait, however, is entirely practical without this.

When it is desired to use the bait as a surface or as a casting bait, the guiding blade or fin is bent until the wings are in alinement or nearly in alinement with the rod B, which causes the bait to ride upon the surface of the water.

In the modified construction shown in Figs. 4 and 5 the guiding-blade is secured directly to the bait-body A. When used in this manner, a suitable slit, as a saw-kerf, is formed in the body and the guiding-blade D' inserted and secured therein. This blade or fin D' is also made of some flexible material, so that it can be bent, as indicated in dotted lines in Fig. 4, to regulate the depth at which the bait shall run.

With the parts arranged as described my improved bait or lure is adapted for use as a surface or as a casting bait and also as a deep-water or as a trolling bait. The guiding-blade may be readily adjusted to adapt the bait to any of the purposes named. A little experience will enable one to make the proper adjustment for the purposes required.

If desired, one or both of the spinners may be omitted, although, of course, the advantage thereof is removed. However, the guiding-blade serves to create a commotion in the water, which is found to be quite satisfactory.

With the hooks arranged as described they may be quickly renewed as necessary or are readily changed by the user. They are, as before remarked, supported so that the points are held away from the body of the bait in the proper position to receive the strike of the fish.

I have illustrated and described my improved bait or lure in detail in the form preferred by me. I am aware, however, that it is capable of considerable structural variation without departing from my invention.

Having thus described my invention, what I claim as new, and desire to secure by Letters Patent, is—

1. In a bait or lure, the combination of a body having a transverse opening therethrough; a rod longitudinally arranged through said body; a split ring on said rod arranged in said opening; a pair of oppositely-arranged hooks on said ring; suitable spinners on said rod; and a guiding blade or fin formed of sheet metal, adapted to be bent, consisting of a central portion and rearwardly-extending wing portions, secured on said rod, all coacting for the purpose specified.

2. In a bait or lure, the combination of a body having a transverse opening therethrough; a rod longitudinally arranged through said body; a split ring on said rod arranged in said opening; a pair of oppositely-arranged hooks on said ring; and a guiding blade or fin, formed of sheet metal, adapted to be bent, consisting of a central portion and rearwardly-extending wing portions secured on said rod, all coacting for the purpose specified.

3. In a bait or lure, the combination of a body having a transverse opening therethrough; a rod longitudinally arranged through said body; a split ring on said rod arranged in said opening; a pair of oppositely-arranged hooks on said ring; and a guiding blade or fin secured on said rod, all coacting for the purpose specified.

4. In a bait or lure, the combination of a body; suitable hooks thereon; and a guiding blade or fin formed of sheet metal, adapted to be bent, consisting of a central portion and rearwardly-extending wing portions, for the purpose specified.

5. In a bait or lure, the combination of a body; suitable hooks thereon; and a guiding blade or fin formed of sheet metal, adapted to be bent, for the purpose specified.

6. In a bait or lure, the combination of a body; suitable hooks thereon; and a guiding blade or fin consisting of a central portion and rearwardly-extending wing portions, for the purpose specified.

7. In a bait or lure, the combination of a body; suitable hooks; and a guiding blade or fin formed of sheet metal adapted to be bent, for the purpose specified.

8. In a bait or lure, the combination of a body having a transverse opening therethrough; a rod arranged transversely through said opening; a split ring on said rod arranged in said opening; and a pair of oppositely-arranged hooks on said ring, for the purpose specified.

9. In a bait or lure, the combination of a body having a transverse opening therethrough; a rod arranged transversely through said opening; and a hook secured thereto.

10. In a bait or lure, the combination of a body having a transverse opening therethrough; a rod arranged transversely through said opening; a split ring on said rod arranged in said opening; and a suitable hook on said ring, for the purpose specified.

In witness whereof I have hereunto set my hand and seal in the presence of two witnesses.

FRED D. RHODES. [L. S.]

Witnesses:
 A. IRENE ADAMS,
 OTIS A. EARL.